Jan. 18, 1955      S. PELLE      2,699,665
CYLINDER LOCK AND LATCH MECHANISM
Filed Sept. 18, 1948      4 Sheets-Sheet 3
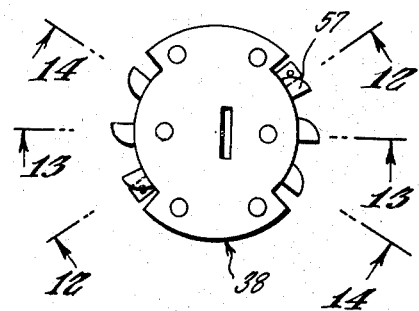
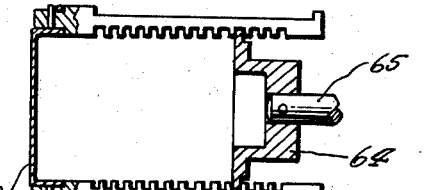
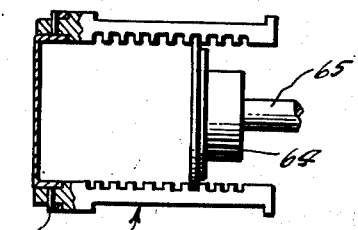
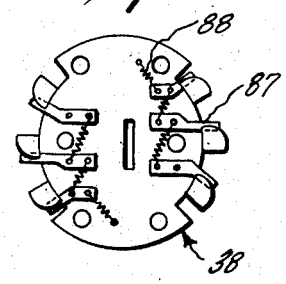
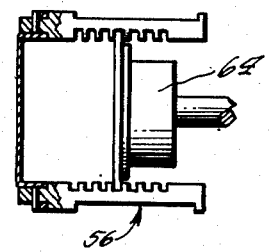
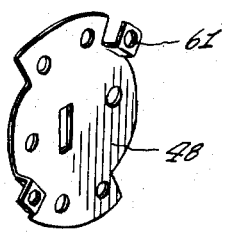
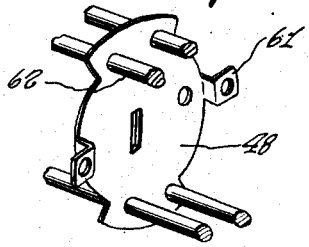
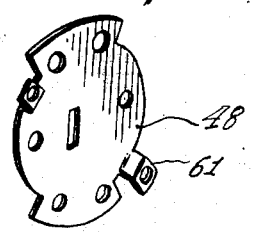
INVENTOR.
STEPHEN PELLE
BY
Carl Miller Jan. 18, 1955         S. PELLE         2,699,665
CYLINDER LOCK AND LATCH MECHANISM
Filed Sept. 18, 1948                 4 Sheets-Sheet 4

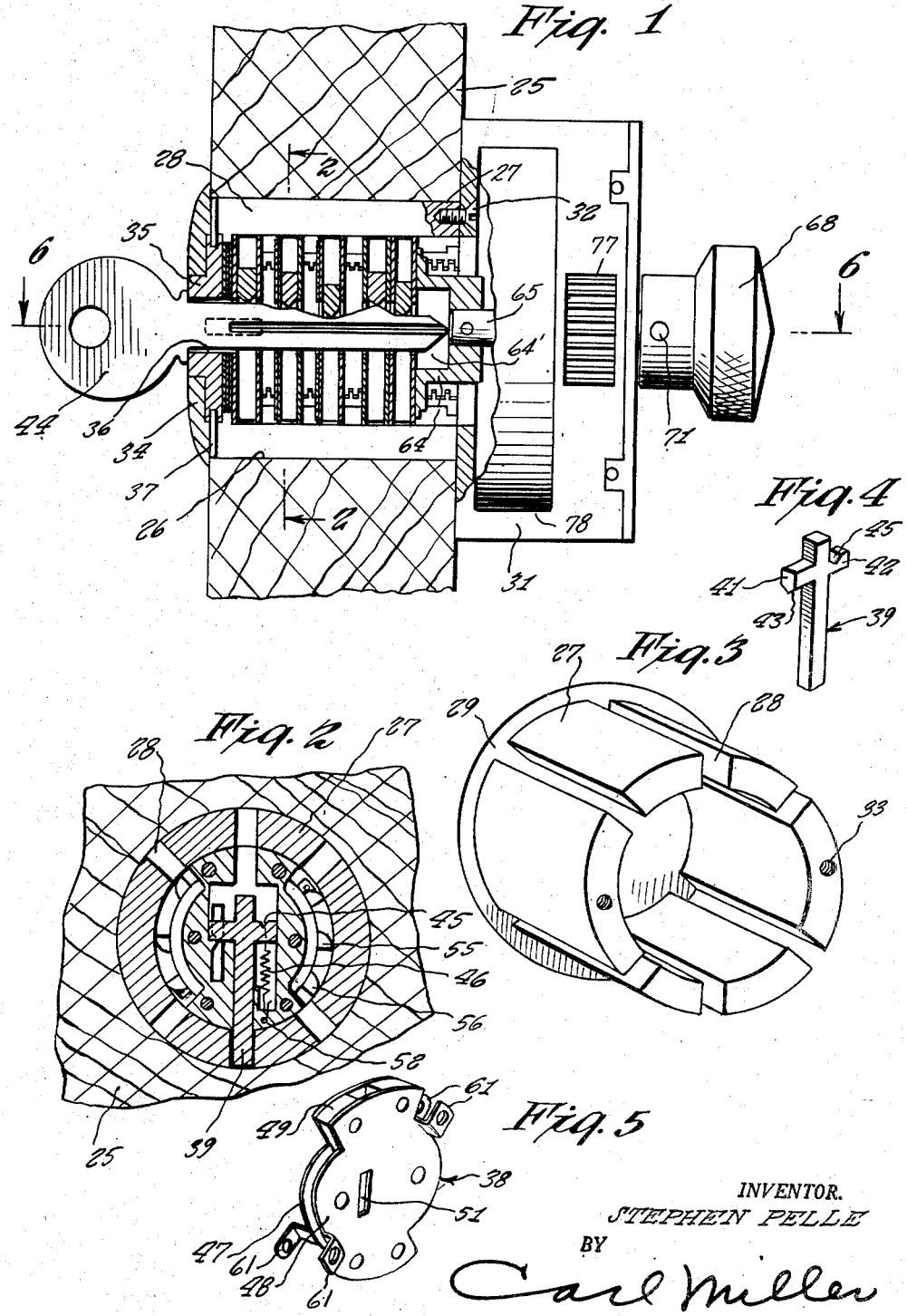

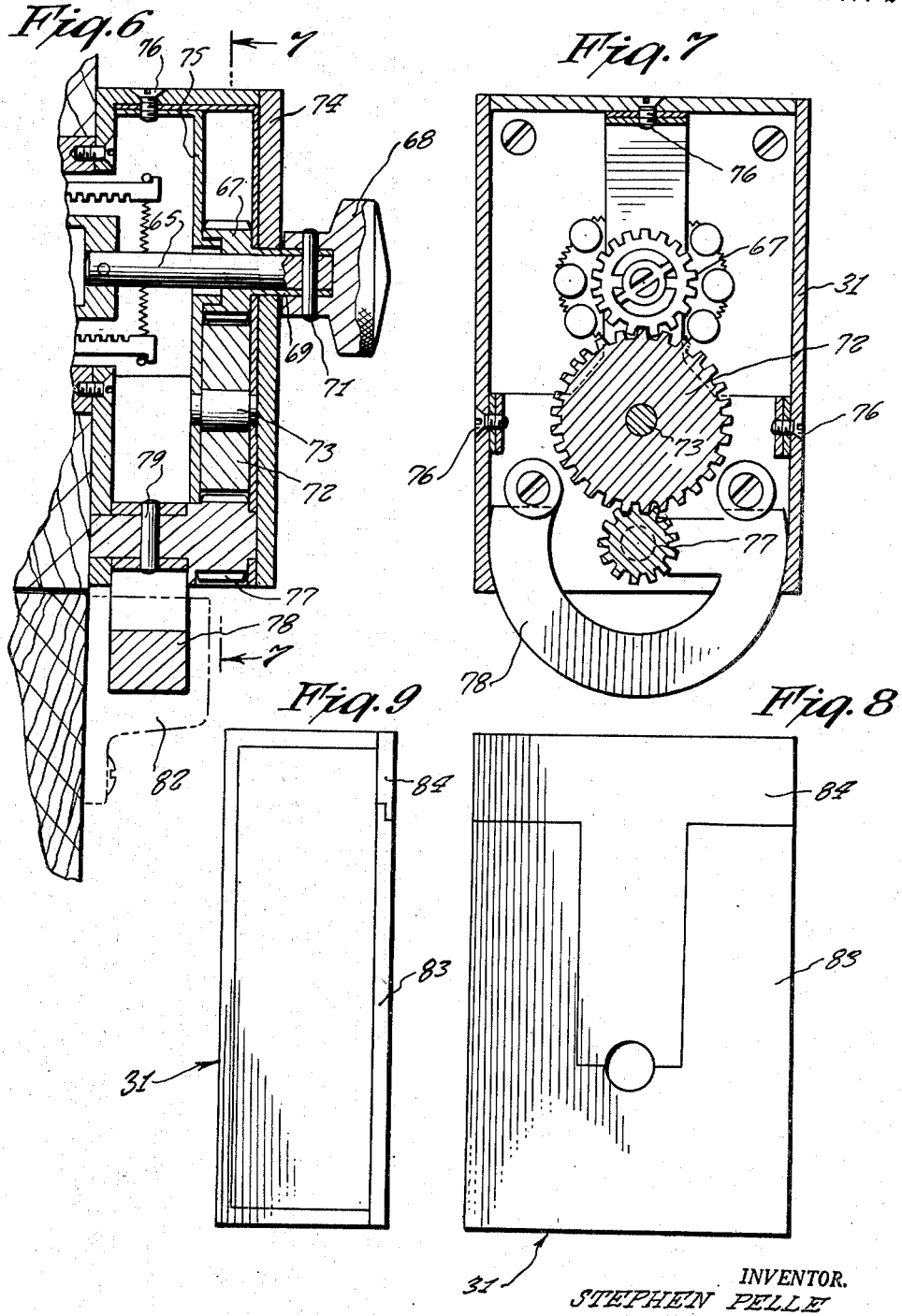

Fig. 19

| | FIRST SECTION | EMPTY SPACE FOR SECOND SECTION | SECOND SECTION | EMPTY SPACE FOR THIRD SECTION | THIRD SECTION | EMPTY SPACE FOR FOURTH SEC. | FOURTH SECTION | FIFTH SECTION | MOVEMENTS IN 1/16 OF AN INCH |
|---|---|---|---|---|---|---|---|---|---|
| NO. 0 KEY | 3 | — | 2 | | 1 | | 2 | 1 | ORIGINAL PARENT KEY NO. 0 |
| NO. 1 KEY | 3 | 2 | | | 1 | | 2 | 1 | MOVE SECOND SECTION 1/16 IN |
| NO. 2 KEY | 3 | 2 | | 1 | | | 2 | 1 | MOVE THIRD SECTION 1/16 IN. |
| NO. 3 KEY | 3 | | 2 | 1 | | | 2 | 1 | MOVE SECOND SECTION 1/16 OUT |
| NO. 4 KEY | 3 | | 2 | 1 | | 2 | | 1 | MOVE FOURTH SECTION 1/16 IN |
| NO. 5 KEY | 3 | | 2 | | 1 | 2 | | 1 | MOVE THIRD SECTION 1/16 OUT |
| NO. 6 KEY | 3 | | 2 | | | 1 | 2 | 1 | MOVE THIRD SEC. 1/16 OUT AND MOVE FOURTH SEC. 1/16 OUT |
| NO. 7 KEY | 3 | 2 | | | | 1 | 2 | 1 | MOVE SECOND SECTION 1/16 IN |
| NO. 8 KEY | 3 | | | 2 | | 1 | 2 | 1 | MOVE SECOND SECTION 1/8 OUT |
| NO. 9 KEY | 3 | | | | 2 | 1 | 2 | 1 | MOVE SECOND SECTION 1/16 OUT |
| NO. 10 | 3 | | | 2 | 1 | | 2 | 1 | MOVE SECOND |
| NO. 50 KEY | 3 | 2 | 1 | 2 | | | | 1 | MOVE SEC MOVE MOVE |

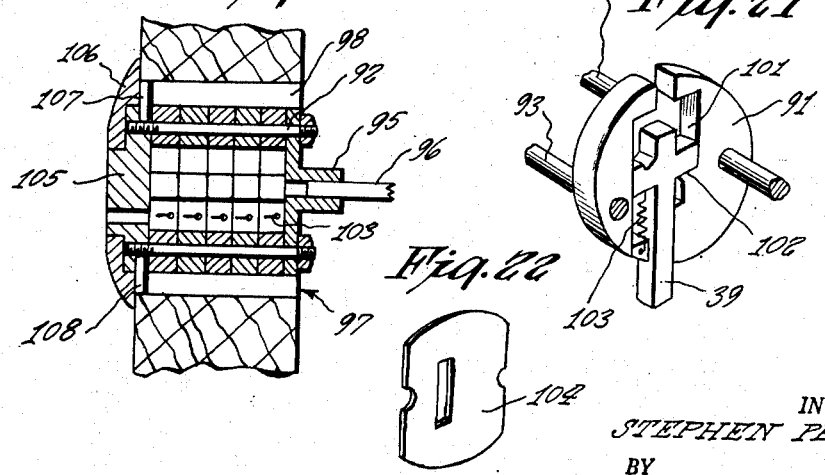

Fig. 20   Fig. 21   Fig. 22

INVENTOR.
STEPHEN PELLE
BY
Carl Miller

United States Patent Office 2,699,665
Patented Jan. 18, 1955

2,699,665

CYLINDER LOCK AND LATCH MECHANISM

Stephen Pelle, Bronx, N. Y.

Application September 18, 1948, Serial No. 49,945

3 Claims. (Cl. 70—135)

This invention relates to locking devices.

It is an object of the present invention to provide a locking device which can be readily altered to match different keys and which can be changed from time to time with little effort so that the previous key which has been used for operating the lock may be made obsolete and its holder made unable to enter the door in which the lock is located and wherein to provide a locking device particularly adapted for use in hotels where the key is given to many different patrons who may retain such keys or copies of the same for later entry.

It is another object of the present invention to provide an adjustable locking device wherein the lock can be adapted for use with different keys, which is of simple construction, easy to adjust, inexpensive to manufacture, easy to assemble, durable and compact and efficient in operation.

For other objects and for a better understanding of the invention, reference may be had to the following detailed description taken in connection with the accompanying drawing, in which Fig. 1 is a longitudinal sectional view of the lock embodying the features of the present invention.

Fig. 2 is a transverse sectional view of the lock with key removed taken on line 2—2 of Fig. 1.

Fig. 3 is a perspective view of the main sleeve body into which the slide elements and their casings are projected.

Fig. 4 is a perspective view of one of the slide elements.

Fig. 5 is a perspective view of the casing for one of the slide elements.

Fig. 6 is a fragmentary sectional view taken on line 6—6 of Fig. 1.

Fig. 7 is a view showing a portion of the latch mechanism in elevation and a portion in section along line 7—7 of Fig. 6.

Fig. 8 is a front elevational view of the gear casing.

Fig. 9 is a side elevational view of the gear casing.

Fig. 10 is an end elevational view of one of the casing units and illustrating the manner in which the casing unit is retained.

Fig. 11 is an end elevational view of a modified form of arrangement for the securement of the slide assembly elements to the rack elements.

Figs. 12, 13 and 14 are respectively longitudinal sectional views of the rack retainers for the casings containing the slide elements.

Fig. 15 is a perspective view of one the rack elements.

Fig. 16 is a perspective view of one of the casing plates.

Fig. 17 is a perspective view of another casing plate with fragments of the securing rods extended therethrough.

Fig. 18 is a perspective view of a third casing plate.

Fig. 19 is a chart showing the different combinations for the setting of the slide elements.

Fig. 20 is a fragmentary and sectional view of a modified form of the invention wherein the slides are retained in thick disks.

Fig. 21 is a perspective view of one of the disks with a slide in it.

Fig. 22 is a perspective view of a spacing plate.

Referring now particularly to Figs. 1 to 19, 25 represents a door in which my lock device is disposed. The door is formed with an opening 26 into which extends a main body sleeve 27 having circumferentially spaced longitudinally and radial extending slots 28 and a front flange 29. This body sleeve is held within the opening 26 by gear casing 31 fixed to the inner side of the door and made secure to the body sleeve by fastening screws 32 entering holes 33, Fig. 3. The assembly will be retained against rotation in the opening 26 by means of its tight frictional engagement with the side faces of the door. The front portion of the body sleeve has an opening 34 in which fits a key hole plate 35 having a key hole 36. The plate 35 has pins 37 projecting therefrom to limit the movement of the key hole plate. These pins 37 may extend into grooves in the sleeve body or casing 27.

Adapted to be fitted into the sleeve 27 are slide assemblies one of which is indicated generally at 38, Fig. 5. These slide assemblies have slide elements 39, Fig. 4, with transverse portions 41 and 42. The transverse portion 41 is beveled as indicated at 43 to provide an edge for engaging a depression or raised part of a key 44 when extended into the lock. The portion 42 is notched at 45 to receive a spring 46 for normally urging the downward movement of the slide 39. The assembly 38 also includes a casing formed of two parts 47 and 48 held in spaced relationship by spacers 49. These casing parts are relieved at their opposite sides and have holes 51 for receiving the key to locate the key beneath the beveled edge portion 41 of the slide. The spring 46 is anchored as indicated at 52 to these casing parts. The slides 39 will normally extend into any of the radially extending slots 28 of the sleeve 27 whereby to prevent the rotation of the assembly of slides. When the key is inserted, the slides will be elevated and the assembly of slides can be rotated.

In order to retain the slide assemblies in place at the proper locations to which they have been adjusted, rack assemblies as shown in Figs. 12, 13 and 14 are disposed within the sleeve body 27 in such a manner as to hold the slide assemblies against axial displacement within the body 27. These rack assemblies are indicated respectively at 54, 55 and 56. Each rack assembly comprises rack bars 57 diametrically spaced from one another and pivotally connected by a pin 58 with a retaining cover 59 having inwardly bent portions to receive the ends. The rack assemblies are angled to different positions in order to permit the fitting of one within the other. The cover of one assembly may engage a slide assembly to hold it in place against movement in one direction. When the rack elements 57 are angled inwardly as illustrated in Fig. 10, the rack teeth formation may secure the slide assemblies against displacement in the opposite direction. The casing parts 47 and 48 will enter the rack formations and thereby be retained.

On the slide assembly casing parts 47 and 48 are projections 61 for receiving and supporting rack bars 57. The projections 61 for the different slide assemblies may extend at different angles. The slide assemblies are held against rotation relative to each other and made secure to the key hole plate by bolts 62 extended in pairs at the upper and lower portions respectively of the slide assembly casing parts.

The slide assemblies will be arranged longitudinally of the sleeve body according to the particular key to be used. The arrangement can be set up in any one of the different combinations as set forth in chart 63 as shown in Fig. 19. With the rack elements 57 swung in as shown in Fig. 10, the slide assemblies will be properly located and retained against axial displacement. At the free ends of the rack bars, there is mounted a cup shaped member 64 engaging with the rack teeth formations to which is connected a shaft 65. The cup shaped member 64 is rotatably held adjacent the last slide assembly by the rack teeth formations of the rack bars 57 of the rack assemblies 54, 55 and 56 (Figs. 12, 13 and 14), in that the cup shaped member 64 can be rotated by the knob 68 through shaft 65 when the slide assemblies 38 are held against rotation by slides 39 in the sleeve 27.

The member 64 has frictional engagement with the slide assemblies and has an opening 64' for receiving the end of the key. When the key is inserted, the member 64 and shaft 65 is turned. Fixed to the shaft 65 is a pinion 67 and a knob 68. The pinion 67 has a sleeve portion 69 which extends outwardly through the casing 31 and the parts are connected together by the pin 71. The pinion 67 meshes with a gear 72 journalled to the casing by a pin 73 extending through supporting members 74 and 75 which are fastened within the casing by screws 76. The gear 72 is in mesh with a pinion 77 which is locked to a latch arm 78 by a pin 79. The latch arm 78 is of arcuate shape and may engage a member 82. The casing 31 comprises separable parts 83 and 84, Figs. 8 and 9.

Supporting rack bars 57 are rotatable upon their own axis so as to unlock from slide assemblies 38. These said slide assemblies thereby are adjustable into various positions on the supporting rack bars. Pin 58 serves as the stop at the end of this said rotation of the supporting rack bar.

In Fig. 11 there is shown a modified form of arrangement for the securement of the slide assembly elements to the rack elements 57. This is effected by levers 87 adapted to enter rack formations of the rack elements and which are retained within the rack formations by springs 88.

Referring now to Figs. 20 to 22, there is shown a modified form of the invention wherein the slides 39 are retained by disks 91 which can be assembled on rods 92 and 93. A member 95 is secured to the disks by the rods 92 and 93 and will turn with the same to rotate a shaft 96 which may be connected to a latch element or to a gearing arrangement above described. These disks are assembled in a body sleeve 97 having circumferentially spaced radially extending slots 98 adapted to receive the slides 39. The slides 39 are operable in openings 101 within the disk 91 and are normally urged against a shoulder 102 by a spring 103. In order to alter the various combinations, one or more spacer elements 104 are disposed in the assembly. The rods 92 and 93 are connected to a key plate 105 which is rotatable in a front face portion 106 on the body sleeve. Pins 107 on the plate 105 are confined within arcuate slots 108 in body sleeve 97.

It will now be apparent that there has been provided a locking arrangement which can be adapted or altered for use with different keys and wherein the lock arrangement can be changed from time to time so that a different key is required.

Having thus set forth and disclosed the nature of my invention, what is claimed is:

1. A lock device comprising a hollow sleeve adapted to fit in an opening through a door, a plurality of slide assemblies disposed within the sleeve, means within the sleeve for retaining said assemblies in predetermined position, a key plate secured to the said hollow sleeve, said key plate and said slide assemblies having openings for receiving a key, said hollow sleeve having slots into which slides of the slide assemblies extend and out of which the slides are withdrawn on insertion of a key, a shaft held by the said means for retaining the said assemblies and adapted to be operated by said key inserted into the openings of the said slide assemblies.

2. A lock device comprising a hollow sleeve adapted to fit in an opening through a door, means for securing said sleeve to the door, a plurality of slide assemblies disposed and movable within the sleeve, means within the sleeve for retaining said assemblies in spaced relationship with respect to one another and to permit adjustment of the assemblies to different spacings and arrangements, a key plate secured to the hollow sleeve, said key plate and said slide assemblies having openings for receiving a key, a latch mechanism, said hollow sleeve having slots into which slides of the said slide assemblies extend and out of which the slides are withdrawn on insertion of a key, a shaft held by the said means for retaining the said assemblies, a casing secured to the said hollow sleeve and receiving said shaft, said shaft extending through the casing and at least indirectly in frictional engagement with the last of the said assemblies, said latch mechanism including a first gear secured to the shaft, a second gear in mesh with the first gear, a third gear journalled in the casing, a latch element secured to the third gear to be rotated by the same and a knob connected to the end of the shaft extending through the casing whereby the latch mechanism can be operated from the inside of the door independently of the said slide assemblies.

3. A lock device comprising a hollow sleeve, a key plate secured to the hollow sleeve and having an opening for receiving a key, said hollow sleeve having a longitudinal slot, slide assemblies being movable within said sleeve and having slide elements adapted to enter the longitudinally extending slot of the hollow sleeve to effect locking engagement therewith, said slide assemblies having openings therein for receiving a key, and rack assemblies extending into the sleeve and adapted to engage the slide assemblies to retain the same in the selected spaced relationship within the hollow sleeve, a latch mechanism operable by the said key and a member rotatably held adjacent the last of the said slide assemblies and operatively connected with the said latch mechanism, and the said latch mechanism being operative upon inserting the end of the said key in an opening of the said member.

References Cited in the file of this patent

UNITED STATES PATENTS

| Number | Name | Date |
|---|---|---|
| 327,715 | Paull et al. | Oct. 6, 1885 |
| 1,352,239 | Baird | Sept. 7, 1920 |
| 1,431,735 | Freysinger | Oct. 10, 1922 |
| 2,150,639 | Simon | Mar. 14, 1939 |
| 2,358,164 | Honger | Sept. 12, 1944 |